(12) United States Patent
Kinoshita et al.

(10) Patent No.: US 11,029,231 B2
(45) Date of Patent: Jun. 8, 2021

(54) ASSESSING DEVICE, ASSESSING SYSTEM, ASSESSING METHOD, AND COMPUTER-READABLE RECORDING MEDIUM

(71) Applicant: NEC Corporation, Tokyo (JP)

(72) Inventors: Shohei Kinoshita, Tokyo (JP); Shigeru Kasai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 124 days.

(21) Appl. No.: 16/341,488

(22) PCT Filed: Oct. 20, 2017

(86) PCT No.: PCT/JP2017/038020
§ 371 (c)(1),
(2) Date: Apr. 12, 2019

(87) PCT Pub. No.: WO2018/079438
PCT Pub. Date: May 3, 2018

(65) Prior Publication Data
US 2019/0301968 A1    Oct. 3, 2019

(30) Foreign Application Priority Data

Oct. 25, 2016 (JP) .............................. JP2016-208663

(51) Int. Cl.
*G01M 7/02* (2006.01)
*G01N 29/07* (2006.01)

(52) U.S. Cl.
CPC .............. *G01M 7/025* (2013.01); *G01M 7/02* (2013.01); *G01N 29/075* (2013.01)

(58) Field of Classification Search
CPC ....... G01M 7/025; G01M 7/02; G01N 29/075
See application file for complete search history.

(56) References Cited

U.S. PATENT DOCUMENTS

| 4,843,847 A | * | 7/1989 | Watts ........................ B06B 3/00 |
| | | | 73/598 |
| 4,956,999 A | * | 9/1990 | Bohannan ................ G01H 1/00 |
| | | | 73/587 |

(Continued)

FOREIGN PATENT DOCUMENTS

| JP | 2008-008810 A | 1/2008 |
| JP | 2013-072669 A | 4/2013 |

(Continued)

OTHER PUBLICATIONS

English Translation of JP2013-072669.*

(Continued)

*Primary Examiner* — Helen C Kwok
(74) *Attorney, Agent, or Firm* — Sughrue Mion, PLLC

(57) ABSTRACT

An assessing device capable of assessing presence or absence of local damage in a structure is provided. The assessing device includes a dominant frequency identifying unit that identifies a dominant frequency of a vibration at each of a plurality of spots in a structure, based on information indicating the vibration at each of the plurality of spots, a phase difference identifying unit that identifies a phase difference at the dominant frequency between the vibrations at the plurality of spots, based on the dominant frequency and information indicating the vibrations; and an assessing unit that assesses damage in the structure, based on the phase difference.

11 Claims, 6 Drawing Sheets

(56) References Cited

U.S. PATENT DOCUMENTS

| | | | | |
|---|---|---|---|---|
| 5,814,729 | A | * | 9/1998 | Wu ............... G01M 5/0033 356/32 |
| 6,006,163 | A | * | 12/1999 | Lichtenwalner ......... G01H 5/00 702/34 |
| 7,010,981 | B1 | * | 3/2006 | Hull ................. G01N 29/07 702/103 |
| 9,791,416 | B2 | * | 10/2017 | Gebski ................. F27B 3/28 |
| 2002/0124652 | A1 | * | 9/2002 | Schultz ............. E21B 41/0085 73/587 |
| 2006/0079747 | A1 | * | 4/2006 | Beard ............... G01N 29/2475 600/407 |
| 2007/0095138 | A1 | * | 5/2007 | El-Bakry ............... G01H 1/00 73/583 |
| 2010/0262390 | A1 | * | 10/2010 | Caicedo ............... G01V 1/003 702/56 |
| 2012/0287749 | A1 | * | 11/2012 | Kutlik ................. G01S 5/18 367/7 |
| 2016/0116366 | A1 | * | 4/2016 | Da Silva ............. G01N 29/348 702/35 |
| 2019/0033263 | A1 | * | 1/2019 | Giurgiutiu ............ G01N 29/46 |

FOREIGN PATENT DOCUMENTS

| | | |
|---|---|---|
| JP | 2014-228471 A | 12/2014 |
| JP | 2016-099288 A | 5/2016 |
| WO | 2013/190973 A1 | 12/2013 |
| WO | 2016-013201 A1 | 1/2016 |

OTHER PUBLICATIONS

English Translation of WO2016/013201.*
International Search Report for PCT Application No. PCT/JP2017/038020, dated Jan. 16, 2018.
English translation of Written opinion for PCT Application No. PCT/JP2017/038020.

* cited by examiner

Fig.6

| | VALUE |
|---|---|
| CHANGE RATE ($\Delta \Phi_1$) OF PHASE DIFFERENCES BETWEEN SENSORS 101-1 AND 101-2 | −20% |
| SENSORS 101-1 AND 101-2 | −5% |

| | VALUE |
|---|---|
| CHANGE RATE ($\Delta \Phi_2$) OF PHASE DIFFERENCES BETWEEN SENSORS 101-2 AND 101-3 | -30% |
| CHANGE RATE ($\Delta F_2$) OF DOMINANT FREQUENCIES | -5% |

ASSESSING DEVICE, ASSESSING SYSTEM, ASSESSING METHOD, AND COMPUTER-READABLE RECORDING MEDIUM

This application is a National Stage Entry of PCT/JP2017/038020 filed on Oct. 20, 2017, which claims priority from Japanese Patent Application 2016-208663 filed on Oct. 25, 2016, the contents of all of which are incorporated herein by reference, in their entirety.

TECHNICAL FIELD

The present invention relates to an assessing device, an assessing method, and a computer-readable recording medium.

BACKGROUND ART

Various techniques for analyzing a condition of a structure such as a building or a bridge have been developed. As one example, by analyzing a vibration characteristic concerning a structure, damage in the structure is detected.

PTL 1 describes a soundness assessing method for a concrete building and the like. In the soundness assessing method described in PTL 1, first, a microtremor of a concrete building is measured, and from measured data of the microtremor, temporal change of a natural frequency is acquired. Then, in the method described in PTL 1, in a case where a width of daily fluctuation of the natural frequency tends to decrease when a difference between internal and external temperatures of the concrete building increases, it is determined that damage exists in the concrete building.

CITATION LIST

Patent Literature

PTL 1: Japanese Unexamined Patent Application Publication No. 2008-8810

SUMMARY OF INVENTION

Technical Problem

In analysis of a condition of a structure, detection of local damage in the structure is necessary in some cases. However, in the technique described in PTL 1, detection of local damage in a structure is difficult in some cases.

The present invention has been made to solve the above-described problem, and a main object thereof is to provide an assessing device and the like capable of assessing presence or absence of local damage in a structure.

Solution to Problem

An assessing device in one aspect of the present invention includes a dominant frequency identifying means for identifying a dominant frequency of a vibration at each of a plurality of spots in a structure, based on information indicating the vibration at each of the plurality of spots, a phase difference identifying means for identifying a phase difference at the dominant frequency between the vibrations at the plurality of spots, based on the dominant frequency and information indicating the vibrations; and an assessing means for assessing damage in the structure, based on the phase difference.

An assessing method in one aspect of the present invention includes identifying a dominant frequency of a vibration at each of a plurality of spots in a structure, based on information indicating the vibration at each of the plurality of spots, identifying a phase difference at the dominant frequency between the vibrations at the plurality of spots, based on the dominant frequency and information indicating the vibrations, and assessing damage in the structure, based on the phase difference.

A computer-readable recording medium in one aspect of the present invention non-temporarily stores a program causing a computer to perform processing of identifying a dominant frequency of a vibration at each of a plurality of spots in a structure, based on information indicating the vibration at each of the plurality of spots, processing of identifying a phase difference at the dominant frequency between the vibrations at the plurality of spots, based on the dominant frequency and information indicating the vibrations, and processing of assessing damage in the structure, based on the phase difference.

Advantageous Effects of Invention

According to the present invention, it is possible to provide an assessing device capable of assessing presence or absence of local damage in a structure.

BRIEF DESCRIPTION OF DRAWINGS

FIG. 6 is a diagram illustrating an example of change rates of phase differences and dominant frequencies according to the example 1 of the present invention.

EXAMPLE EMBODIMENT

Figures 8, 9:
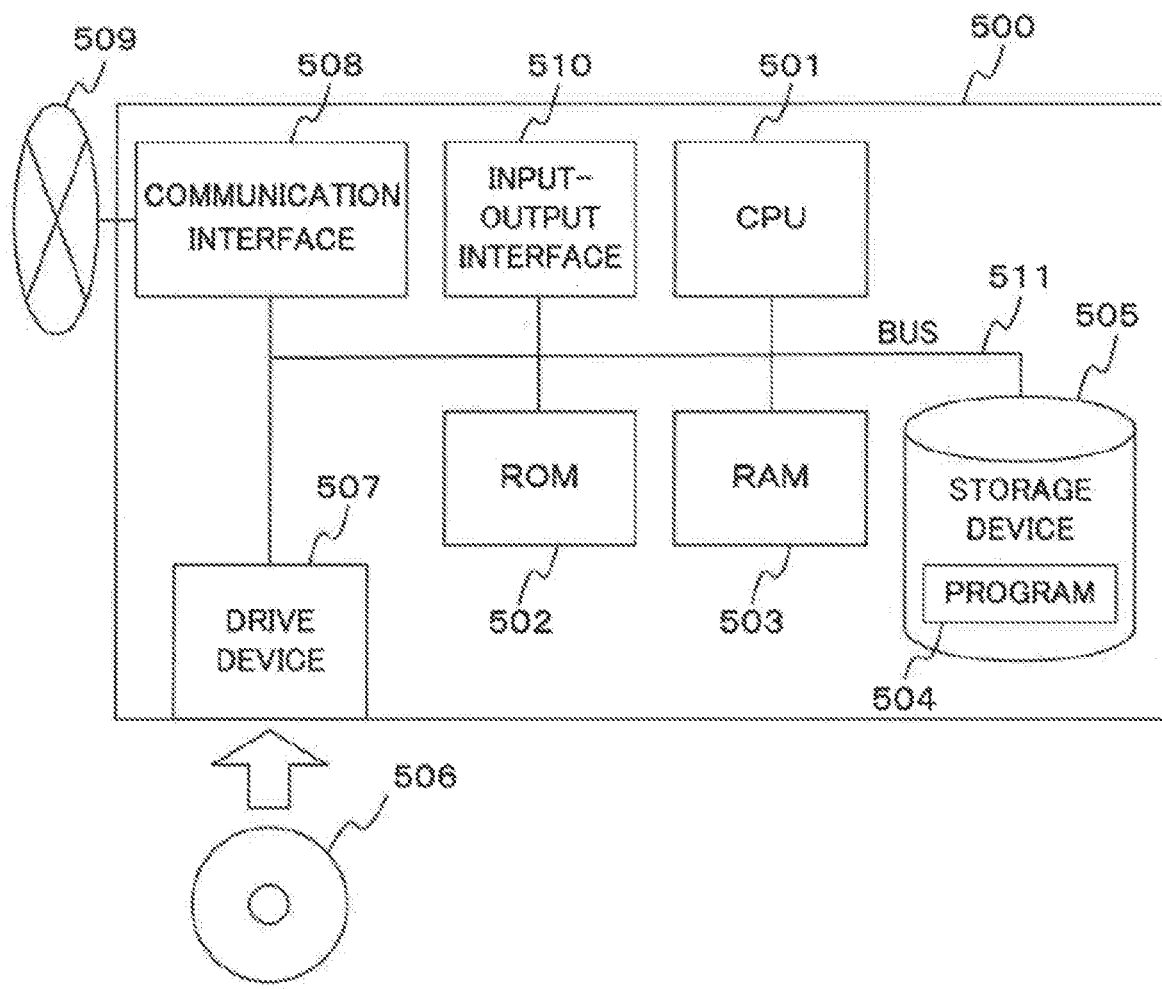
FIG. 8 is a diagram illustrating an example of change rates of phase differences and dominant frequencies according to the example 1 of the present invention.
FIG. 9 is a diagram illustrating an example of an information processing device that achieves an assessing device and the like according to the example embodiment of the present invention.

Each example embodiment of the present invention is described with reference to the accompanying drawings. In each example embodiment of the present invention, each constituent element of each device (system) indicates a block of a functional unit. A part or all of each constituent element of each device (system) are achieved by an arbitrary combination of an information processing device 500 as illustrated in FIG. 9 and a program, for example. The information processing device 500 includes the following constituents as one example.

- a central processing unit (CPU) 501
- a read only memory (ROM) 502
- a random access memory (RAM) 503
- a program 504 loaded in the RAM 503
- a storage device 505 storing the program 504
- a drive device 507 reading from and writing in a recording medium 506
- a communication interface 508 connected to a communication network 509
- an input-output interface 510 inputting and outputting data
- a bus 511 connecting the constituent elements to each other The constituent elements of each device in each example embodiment are achieved by the CPU 501 acquiring and executing the program 504 that achieves functions thereof. For example, the program 504 that achieves the functions of the constituent elements of each device is stored in advance in the storage device 505 or the RAM 503, and is read by the CPU 501, depending on necessity. Note that the program 504 may be supplied to the CPU 501 via the communication network 509, or may be stored in advance in the recording medium 506 and be read and supplied to the CPU 501 by the drive device 507.

There are various modification examples of a method of achieving each device. For example, each device may be achieved by arbitrary combinations of the information processing device 500 and a program which are different from each other per constituent element. Alternatively, a plurality of constituent elements included in each device may be achieved by an arbitrary combination of one information processing device 500 and a program.

A part or all of the constituent elements of each device are achieved by a general-purpose or dedicated circuit including a processor and the like, or a combination thereof. These may be constituted by a single chip, or may be constituted by a plurality of chips connected to each other via a bus. A part or all of the constituent elements of each device may be achieved by a combination of the above-described circuit and the like, and a program.

When a part or all of the constituent elements of each device are achieved by a plurality of information processing devices, circuits, or the like, a plurality of the information processing devices, the circuits, or the like may be arranged in a concentrated manner, or may be arranged in a dispersed manner. For example, the information processing devices, the circuits, or the like may be achieved as a form such as a client-and-server system or a cloud computing system in which each connection therebetween is made via a communication network.

First Example Embodiment

Figure 1:
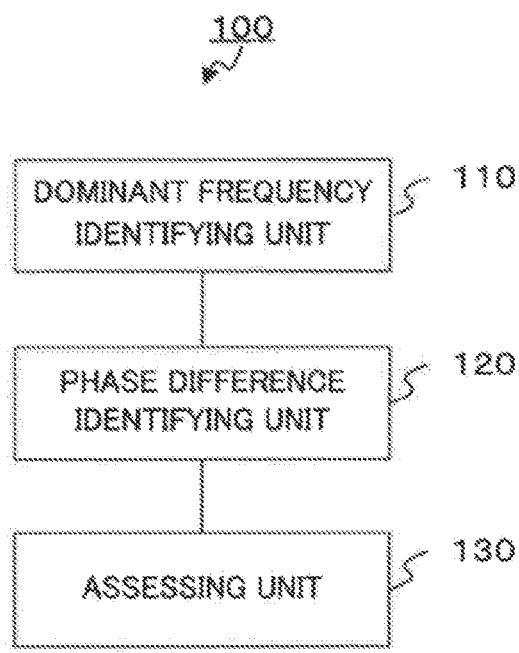
FIG. 1 is a diagram illustrating a configuration of an assessing device according to a first example embodiment of the present invention.

First, a first example embodiment of the present invention is described. FIG. 1 is a diagram illustrating an assessing device according to the first example embodiment of the present invention.

As illustrated in FIG. 1, an accessing device 100 according to the first example embodiment of the present invention includes a dominant frequency identifying unit 110, a phase difference identifying unit 120, and an assessing unit 130. Based on information indicating a vibration at each of a plurality of spots in a structure, the dominant frequency identifying unit 110 identifies a dominant frequency of a vibration at each of the plurality of spots. The phase difference identifying unit 120 identifies a phase difference at the dominant frequency between the vibrations at the plurality of spots, based on the dominant frequency and information indicating the vibrations. The assessing unit 130 assesses damage in the structure, based on the phase difference.

Note that in the present example embodiment, examples of damage in a structure include a crack or corrosion generated in the structure, and a phenomenon causing an insufficient joining such as a gap generated at a part where a plurality of portions constituting the structure are joined to each other. However, damage in a structure is not limited to the above-described examples, and other phenomena that may affect performance of a structure may be treated as damage in the structure.

Figure 2:
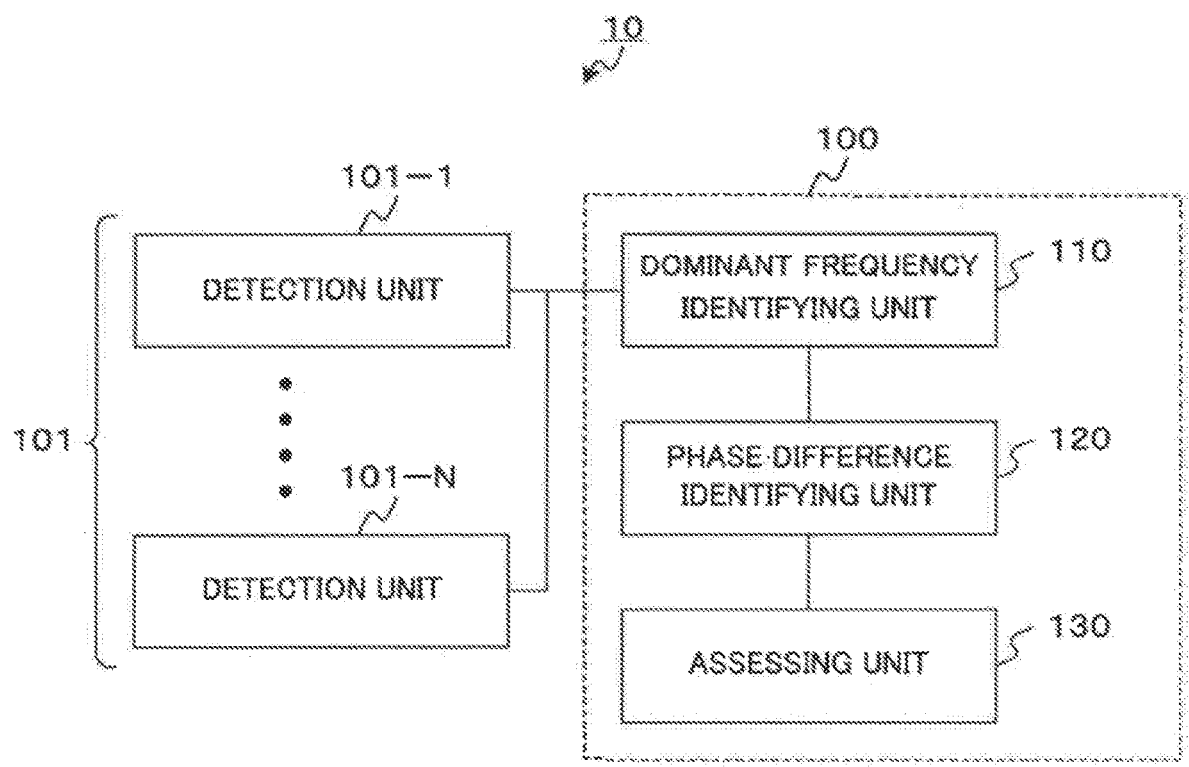
FIG. 2 is a diagram illustrating a configuration of an assessing system including the assessing device according to the first example embodiment of the present invention.

As illustrated in FIG. 2, an assessing system 10 including the assessing device 100 according to the first example embodiment of the present invention is configured. The assessing system 10 includes the assessing device 100 and a plurality of detection units 101. The detection unit 101 detects a vibration of a target object.

In an example illustrated in FIG. 2, as the detection units 101, there are depicted N detection units 101 (where N is a natural number equal to or larger than two) including detection units 101-1 to 101-N, but the number of the detection units 101 is not particularly limited. Depending on an assessing-target structure and the like, the required number, arrangement places, and the like of the detection units 101 are appropriately determined. The detection unit 101 is achieved by a general vibration sensor, for example. By an adhesive, a permanent magnet, a mechanical bonding, or the like, the detection unit 101 is attached to a structure that is a target to be assessed by the assessing device 100.

Further, the assessing device 100 and the detection unit 101 are connected via a wireless or wired communication network or the like, for example. Note that a means for connecting the assessing device 100 and the detection unit 101 to each other is not particularly limited. By other means, the assessing device 100 may acquire and use information indicating vibrations detected by the detection units 101. In the example illustrated in FIG. 2, the assessing device 100 makes assessment, based on information indicating a vibration detected by each of a plurality of the detection units 101.

Next, constituent elements of the assessing device 100 according to the present example embodiment are described.

As described above, the dominant frequency identifying unit 110 identifies each dominant frequency of vibrations at a plurality of spots. Information indicating vibrations at a plurality of spots can be acquired, for example, by detecting vibrations by each of a plurality of the detection units 101 attached to a structure.

Figure 3:
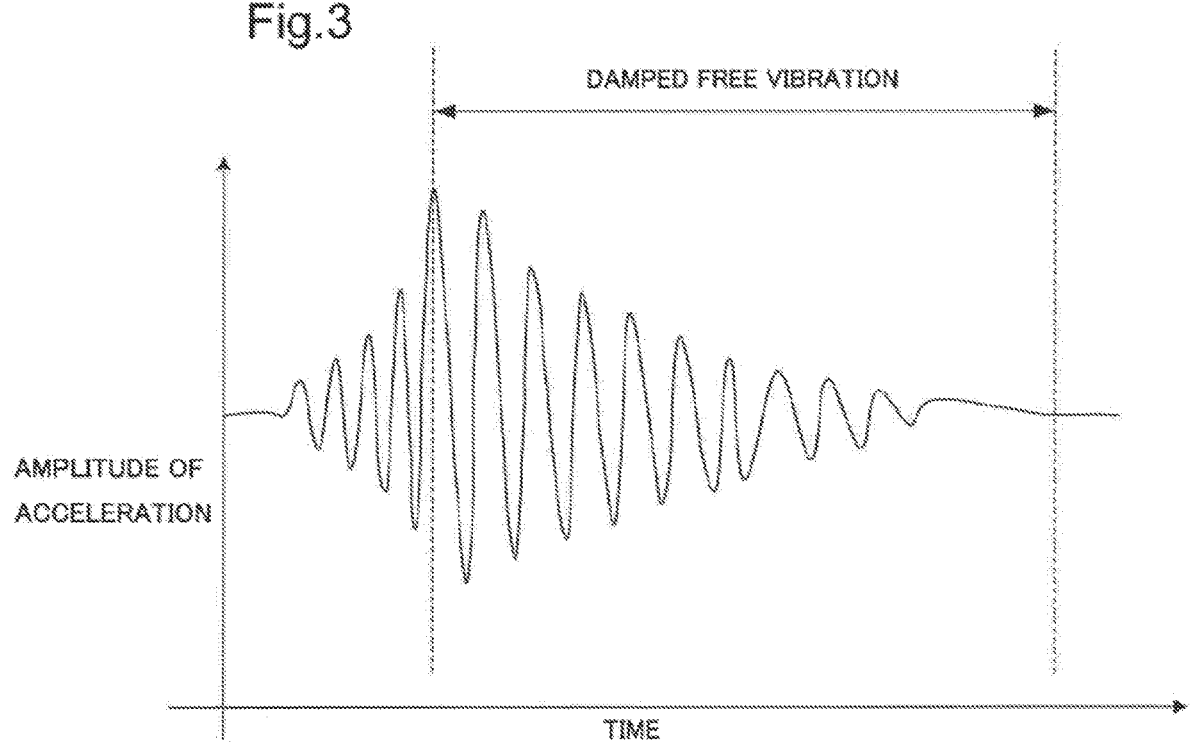
FIG. 3 is a diagram illustrating an example of a damped free vibration targeted by the assessing device according to the first example embodiment of the present invention.

The dominant frequency identifying unit 110 identifies a dominant frequency by mainly focusing on a damped free vibration that is one of vibration responses of a structure included in information indicating detected vibrations. FIG. 3 illustrates an example of a damped free vibration. In FIG. 3, the damped free vibration is represented by a portion indicated by an arrow in temporal change concerning acceleration of a vibration. In other words, the damped free vibration is a vibration in which excitation from the outside is not applied and an amplitude of acceleration decreases depending on time. A vibration that is a damped free vibration can be extracted, for example, based on a shape of an envelope curve of a time-history waveform indicating acceleration of the vibration.

A dominant frequency indicates a main frequency component included in a vibration. In the present example embodiment, as described below, the dominant frequency mainly indicates a frequency component at which an amplitude of a vibration becomes maximum.

Generally, in a damped free vibration generated in a structure, a natural vibration depending on a dynamic characteristic of the structure becomes dominant. For this reason, generally, a dominant frequency identified by the dominant frequency identifying unit 110 approximately corresponds to a natural vibration of an assessing-target structure. From this, behavior of a vibration at the dominant frequency approximately corresponds to a dynamic characteristic of the structure. Accordingly, paying attention to the above-described dominant frequency enables a dynamic characteristic of a structure to be grasped.

When damage or the like is generated in a structure, a dynamic characteristic of the structure changes. In other words, in this case, a dominant frequency may change. Accordingly, for example, continuously identifying a dominant frequency of a structure enables damage or the like in a structure to be detected.

The dominant frequency identifying unit 110 identifies, as a dominant frequency, a frequency at which an amplitude becomes maximum, among frequency components included in a damped free vibration. Information indicating a vibration that is acquired by the detection unit 101 or the like generally indicates temporal change of the vibration. In this case, for example, the dominant frequency identifying unit 110 transforms temporal change of a vibration into frequency components, and identifies a dominant frequency, based on an amplitude at each frequency.

The dominant frequency identifying unit 110 transforms temporal change of a vibration into frequency components by the discrete Fourier transform, the fast Fourier transform, or the like, for example. Further, by using an autoregressive model or the like, the dominant frequency identifying unit 110 may model a damped free vibration represented by information indicating a detected vibration, and may acquire a dominant frequency, based on a frequency characteristic of the model. As described above, for example, the dominant frequency identifying unit 110 identifies, as a dominant frequency, a frequency having the largest amplitude.

The phase difference identifying unit 120 identifies a phase difference at a dominant frequency between vibrations at a plurality of spots in a structure. More specifically, the phase difference identifying unit 120 identifies a phase difference at a dominant frequency between vibrations at two spots among a plurality of spots in a structure.

Note that it is assumed in the present example embodiment that information indicating vibrations at three or more spots in a structure can be acquired, such as the detection units 101 of the assessing system 10 are installed at three or more spots in a structure. In this case, the phase difference identifying unit 120 identifies a phase difference for at least one set of two spots selected from the three or more spots. In this case, the two spots included in each set are preferably adjacent spots.

As described above, in some cases, a natural frequency of a structure changes depending on damage or the like generated in the structure. Accordingly, in some cases, a condition of a structure such as presence or absence of damage in the structure, can be assessed based on change in the natural frequency of the structure, by detecting change in a dominant frequency, or the like, for example.

However, in a method in which assessment on damage in a structure is performed based on change in a natural frequency of the structure, assessment of presence or absence of damage or the like in the structure is difficult in some cases. Cases where it is difficult to assess presence or absence of damage or the like, based on change in a natural frequency of a structure include a case where local damage is generated in a structure. Examples of the case where local damage is generated in a structure include a case where damage is generated at a joined part that is a part where two or more members are joined to each other.

In some cases, a structure is configured with two or more members being joined to each other. For example, when a structure is a bridge, the structure is configured with a floor plate and a main girder being joined to each other. In a structure including such a configuration, force concentrates at a joined part where members are joined to each other. Accordingly, in some cases, at the joined part, local damage may be generated. Then, when damage is generated at the joined part, a rigidity of the joined part decreases, and a natural frequency of the structure including the joined part changes.

However, when local damage such as damage at a joined part is generated, in some cases, change in a natural frequency is relatively small as compared with the case where large damage is generated in a structure. For this reason, in the method in which assessment on damage in a structure is performed based on change in a natural frequency of the structure, assessment on presence or absence of damage or the like in a structure is difficult in some cases.

Meanwhile, when damage is generated at a joined part, constraint between joined members declines. In other words, a condition of a mechanical joint between joined members changes. As a result of this change, vibration responses including that of the joined part change. For example, at constituent members sandwiching a joined part, phases of vibrations at a dominant frequency change. In other words, a phase difference at the dominant frequency between vibrations at the constituent members sandwiching the joined part changes.

In view of it, in the present example embodiment, the phase difference identifying unit 120 identifies a phase difference at a dominant frequency between vibrations at two spots among a plurality of spots in a structure. By identifying a phase difference, damage at a spot between the two spots can be assessed in the below-described assessing unit 130.

Positions of two spots are determined in such a manner that the above-described joined part exists between the two spots (i.e., the positions of the two spots sandwich the joined part), thereby enabling damage-related assessment on presence or absence of damage or the like at the joined part. As one example, when a structure is a bridge, one of a plurality of the detection units 101 is provided at a floor plate, and another of a plurality of the detection units 101 is provided at a main girder, whereby local damage generated at a joined part between the floor plate and the main girder can be detected.

Further, two spots for which a phase difference is acquired by the phase difference identifying unit 120 are neighboring spots, among a plurality of spots in a structure, whereby a position where local damage is generated can be more accurately identified.

The phase difference identifying unit 120 identifies a phase difference by various procedures. For example, the phase difference identifying unit 120 calculates a difference between phase values that are acquired by performing the Fourier transform on a free damped vibration represented by information indicating vibrations at spots, and thereby identifies a phase difference at a domain frequency between the vibrations at the two spots.

The phase difference identifying unit 120 may identify a phase difference by using time-history waveforms in a band of a dominant frequency of vibrations at spots. In this case, the phase difference identifying unit 120 derives the time-history waveforms indicating temporal change in the band of the dominant frequency by performing band limitation on information indicating vibrations at spots, by a band-pass filter or the like. Then, the phase difference identifying unit 120 acquires, for each of the time-history waveforms, a time at which an amplitude of the time-history waveform becomes maximum, and further acquires a difference between the times, thereby identifying a phase difference.

When information indicating vibrations at three or more spots in a structure is acquired, similarly, the phase difference identifying unit 120 identifies a phase difference for each set of the two spots appropriately selected from the three or more spots.

The assessing unit 130 assesses damage in a structure, based on a phase difference acquired by the phase difference identifying unit 120. When a phase difference at a dominant frequency between vibrations at two spots in a structure indicates that damage is generated in the structure, the assessing unit 130 assesses damage as being generated at a portion between the two spots.

As one example, the assessing unit 130 assesses damage in a structure by comparing, with a phase difference at a reference timing, each phase difference acquired by the phase difference identifying unit 120.

For example, when a change rate of a phase difference between two spots acquired by the phase difference identifying unit 120 and a phase difference at the reference timing for the same spots satisfies a predetermined requirement, the assessing unit 130 assesses damage as existing at a portion between the two spots in a structure. As one example, when a change rate of a phase difference between two spots and a phase difference at the reference timing for the same spots exceeds a threshold value, the assessing unit 130 assesses damage as being generated at a portion between the two spots. In this case, the threshold value is appropriately determined depending on a structure, positions of two spots in the structure, whether or not a joined part is included in a portion between the two spots, or the like. Further, a change rate of phase differences, which is a value standardized by a phase difference or the like at the reference timing, for example, is used rather than an absolute value of a phase difference, whereby, setting of the threshold value depending on a portion in a structure becomes unnecessary, or the like, and therefore setting of the threshold value becomes easy.

The assessing unit 130 may assess damage in a structure, based on another method. For example, the assessing unit 130 may assess damage in a structure, based on a variation of phase differences acquired by the phase difference identifying unit 120.

In this case, for example, vibrations are detected a plurality of times at two target spots by the detection units 101 or the like of the assessing system 10. Concerning information indicating vibrations that are acquired a plurality of times at timings in a predetermined fixed range by the detection units 101 or the like, the dominant frequency identifying unit 110 identifies a dominant frequency concerning each of the vibrations. Further, based on the identified dominant frequency and the like, the phase difference identifying unit 120 acquires each phase difference.

Then, the assessing unit 130 assesses damage in a structure, based on a variation of a plurality of phase differences acquired as described above for vibrations. As one example, the assessing unit 130 assesses damage as existing at a portion between two spots in a structure, based on a change rate between a variation of a plurality of phase differences acquired by the phase difference identifying unit 120 and a variation of a plurality of phase differences at the reference timing. When a variation of a plurality of phase differences satisfies a predetermined requirement such as a requirement that the variation exceeds a threshold value, the assessing unit 130 may assess damage as existing at a portion between the two spots in the structure.

Note that the assessing unit 130 may assess damage in a structure by an appropriate combination of a plurality of the above-described methods, the combination being made depending on necessity.

Figure 4:
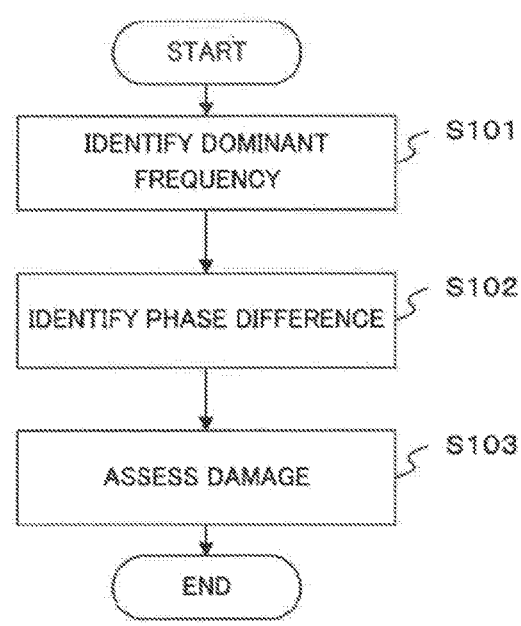
FIG. 4 is a flowchart illustrating an operation of the assessing device according to the first example embodiment of the present invention.

Subsequently, an operation of the assessing device 100 in the first example embodiment of the present invention is described by using a flowchart illustrated in FIG. 4.

First, the dominant frequency identifying unit 110 identifies a dominant frequency (a step S101). The dominant frequency identifying unit 110 identifies a dominant frequency for each of vibrations at a plurality of spots in a structure. As information indicating vibrations at a plurality of spots in a structure, the dominant frequency identifying unit 110 acquires and uses information indicating vibrations detected by the detection units 101 in the assessing system 10, for example.

Next, the phase difference identifying unit 120 identifies a phase difference between vibrations at two spots in the structure, based on the dominant frequency acquired at the step S101 and the information indicating the vibrations (a step S102). Note that when information indicating vibrations at three or more spots in the structure is acquired, as one example, the phase difference identifying unit 120 successively identifies a phase difference for each of a plurality of sets of two spots among the three or more spots.

Next, the assessing unit 130 assesses damage in the structure, based on the phase difference identified at the step S102 (a step S103). In the case where a change rate, a variation, or the like of the phase difference between the two spots in the structure exceeds a predetermined threshold value for example, the assessing unit 130 assesses damage as being generated at a spot between the two spots in the structure. When a phase difference is acquired for a plurality of sets of two spots in the structure at the step S102, the assessing unit 130 may assess damage for each of a plurality of sets of two spots.

As described above, the assessing device 100 according to the first example embodiment of the present invention assesses damage in a structure, based on a phase difference at a dominant frequency between vibrations at a plurality of spots in the structure. More specifically, in the assessing device according to the present example embodiment, for vibrations detected at two spots in a structure, a phase difference at a dominant frequency identified by the dominant frequency identifying unit 110 is identified by the phase difference identifying unit 120. Then, based on the identified phase difference, the assessing unit 130 assesses damage in the structure.

A natural frequency of a structure may change when damage is generated in the structure. However, when damage generated in a structure is local damage, change in a natural frequency of the structure is small in some cases. For this reason, when damage in a structure is assessed based on a natural frequency of the structure, there is a possibility that local damage in the structure is not detected.

In contrast to this, when local damage is generated in a structure, change in a phase difference between vibrations at spots around a portion where damage is generated occurs in some cases. In other words, paying attention to a phase difference between vibrations enables local damage in a structure to be detected in some cases.

In the assessing device 100 according to the present example embodiment, a phase difference at a dominant frequency between vibrations at a plurality of spots in a structure is used in assessing damage in the structure. Accordingly, the assessing device 100 according to the present example embodiment enables assessment of local damage in the structure, such as presence or absence of local damage in the structure.

Example 1

Next, description is made on an example in which the assessing device 100 and the assessing system 10 according to the first example embodiment of the present invention are applied to assessment of presence or absence of local damage in a target object.

In a first example, the assessing system 10 targeted a concrete block, and assessed presence or absence of damage generated in the concrete block. Concretely, a crack was formed as simulated damage on a surface of the concrete block that was a test piece. Then, based on vibrations before and after the formation of the crack, the damage was assessed by the assessing system 10.

Figure 5:
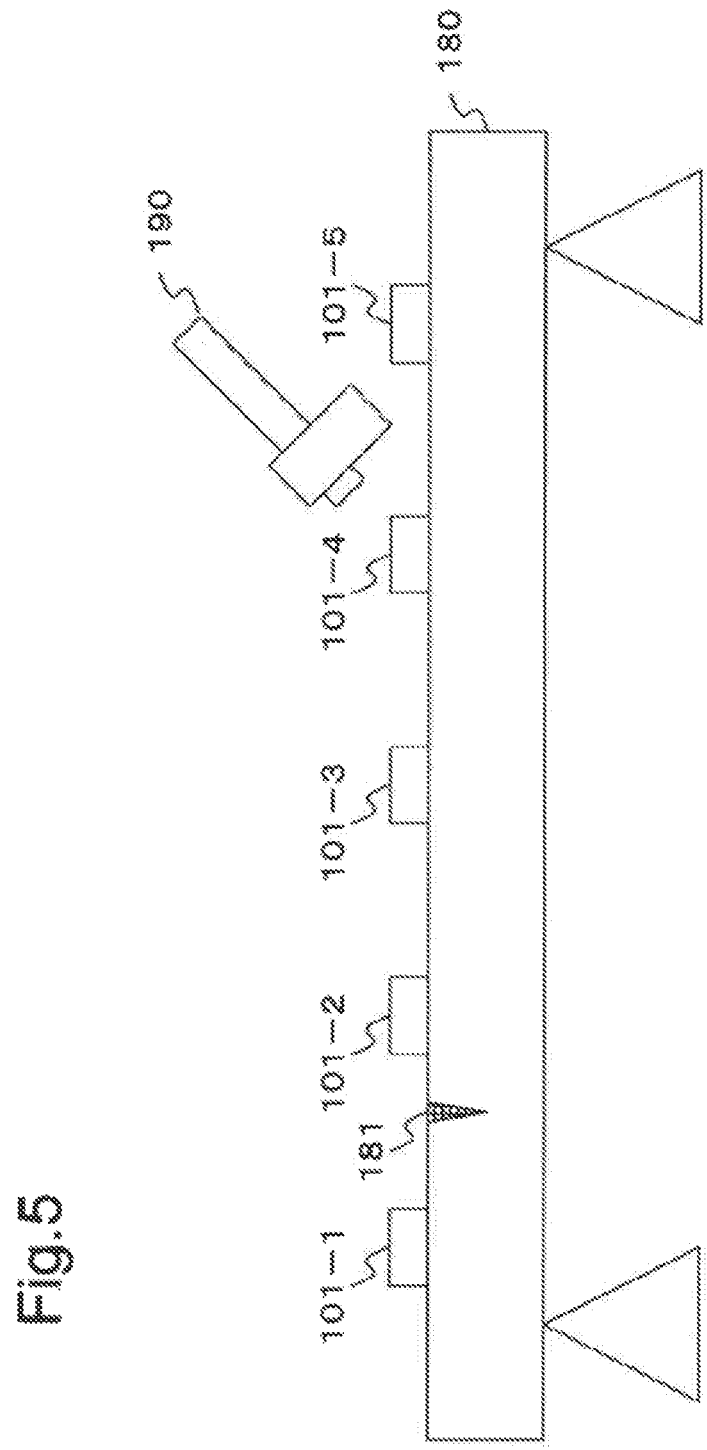
FIG. 5 is a diagram illustrating an example of a test piece according to an example 1 of the present invention.

FIG. 5 illustrates an example of a concrete block as a target of assessment on damage. In the present example, a rectangular-shaped concrete block 180 was used as a test piece. On one surface of the concrete block 180, five detection units 101 including detection units 101-1 to 101-5 were attached. As each of the detection units 101, a vibration sensor was used. The vibration sensor used as the detection unit 101 is of a piezoelectric type, and is of a voltage output type in which a signal amplification circuit is incorporated. Between the detection units 101-1 and 101-2, a crack 181 was formed.

In each of cases before and after the crack 181 was formed, the concrete block 180 was excited by hammering that uses a hammer 190. In each of the cases, each of the detection units 101-1 to 101-5 detected a vibration caused by the excitation.

The assessing device 100 assessed damage in the concrete block 180, based on information indicating the vibrations detected by the detection units 101-1 to 101-5.

First, the dominant frequency identifying unit 110 acquired a Fourier spectrum by performing the Fourier transform on the information indicating the vibrations in each of before and after the crack 181 was formed. Then, the dominant frequency identifying unit 110 identified, as a dominant frequency, a frequency at which an amplitude becomes maximum in each of the Fourier spectra before and after the crack 181 was formed.

According to the information indicating the vibrations detected by the detection units 101-1 to 101-5 at a time point before the crack 181 was formed, the dominant frequency was common to the detection units 101-1 to 101-5. A vibration shape at the dominant frequency was a shape similar to that of a flexural primary vibration mode.

According to the information indicating the vibrations detected by the detection units 101-1 to 101-5 at a time point after the crack 181 was formed, the dominant frequency was common to the detection units 101-1 to 101-5. A vibration shape at the dominant frequency was a shape similar to that of the flexural primary vibration mode.

Subsequently, assuming that a phase amount is a value of a phase at the dominant frequency in each of the Fourier spectra before and after the above-described crack 181 was formed, the phase difference identifying unit 120 acquired, as a phase difference, each difference between the phase amounts. In the present example, the phase difference identifying unit 120 identified, as the phase difference, the difference between the phase amounts, at the dominant frequency, of the vibrations detected by the detection units 101-1 and 101-2. The detection units 101-1 and 101-2 are two detection units close to a place where the crack 181 was formed.

Subsequently, the assessing unit 130 acquired a change rate of the phase differences at the dominant frequencies between the vibrations detected by the detection units 101-1 and 101-2 before and after the crack 181 was formed, and assessed damage. The change rate of the phase differences at the dominant frequencies between the vibrations detected by the detection units 101-1 and 101-2 was acquired by using the following equation (1). Note that in the equation (1), $\Delta\Phi_1$ represents the change rate of the phase differences at the dominant frequencies between the vibrations detected by the detection units 101-1 and 101-2 before and after the crack 181 was formed. Further, $\Phi_{1before}$ represents the phase difference at the dominant frequency between the vibrations detected by the detection units 101-1 and 101-2 before the crack 181 was formed. In addition, $\Phi_{1after}$ represents the phase difference at the dominant frequency between the vibrations detected by the detection units 101-1 and 101-2 after the crack 181 was formed.

[Equation 1]

$$\Delta\Phi_1 = \frac{\Phi_{1after} - \Phi_{1before}}{\Phi_{1before}} \qquad (1)$$

Note that for comparison, a change rate of dominant frequencies of the vibrations detected by the detection unit 101-1 was acquired by using an equation (2). Note that in the equation (2), $\Delta F_1$ represents the change rate of the dominant frequencies of the vibrations detected by the detection unit 101-1 before and after the crack 181 was formed. Further, $F_{1before}$ represents the dominant frequency of the vibration detected by the detection unit 101-1 before the crack 181 was formed. In addition, $F_{1after}$ represents the dominant frequency of the vibration detected by the detection unit 101-1 after the crack 181 was formed. Note that in the present example, as described above, the dominant frequencies of the vibrations detected by the detection units 101-1 to 101-5 are common at each of the time points before and after the crack 181 was formed.

[Equation 2]

$$\Delta F_1 = \frac{F_{1after} - F_{1before}}{F_{1before}} \qquad (2)$$

FIG. 6 illustrates the change rate $\Delta\Phi_1$ of the phase differences and the change rate $\Delta F_1$ of the dominant frequencies described above. The change rate $\Delta\Phi_1$ of the phase differences was −20% (percent). Meanwhile, the change rate $\Delta F_1$ of the dominant frequencies was −5%. In other words, a change rate of $\Delta\Phi_1$ to the change rate $\Delta F_1$ was four times. The change rate of the phase differences at the dominant frequencies was a relatively large change rate, as compared with the change rate of the dominant frequencies.

In the present example embodiment, it is considered that a rigidity of the concrete block 180 as a test piece decreased due to the formation of the crack 181 in the concrete block 180, and as a result, a natural frequency of the concrete block 180 decreased. Then, it is considered that the dominant frequency corresponding to the natural frequency decreased following the decrease of the natural frequency of the concrete block 180. Further, it is considered that the formation of the crack 181 between the detection units 101-1 and 101-2 decreased a rigidity of the portion that is in the concrete block 180 and that is between the detection unit 101-1 and the detection unit 101-2. It is considered that as a result of this, the phase difference at the dominant frequency between the vibrations detected by the detection units 101-1 and 101-2 increased. Then, it is considered that since the crack 181 was local, the above-described change rate of the phase differences at the dominant frequencies became relatively large, as compared with the change rate of the dominant frequencies.

As demonstrated in the present example, for the local damage in the structure, the phase difference at the dominant frequency between the vibrations detected by the two detection units 101 changes remarkably as compared with the dominant frequency. Therefore, it is confirmed that even when assessment is difficult in a method based on a change rate of a dominant frequency (i.e., a natural frequency of a structure), the assessing device 100 or the like can assess generation of damage, for example, by appropriately setting a threshold value used in the assessing unit 130.

Example 2

Next, description is made on another example in which the assessing device 100 and the assessing system 10 according to the first example embodiment of the present invention are applied to assessment of presence or absence of damage in a target object.

In the present example, the assessing system 10 targeted a concrete block to which a metal plate was bonded, and assessed presence or absence of damage to a bonded part between the metal plate and the concrete block. Concretely, a gap was formed as simulated damage at the bonded part between the metal plate and the concrete block, which was in the concrete block to which the metal plate was bonded. Then, based on vibrations before and after the formation of the gap, the damage was assessed by the assessing system 10.

Figure 7:
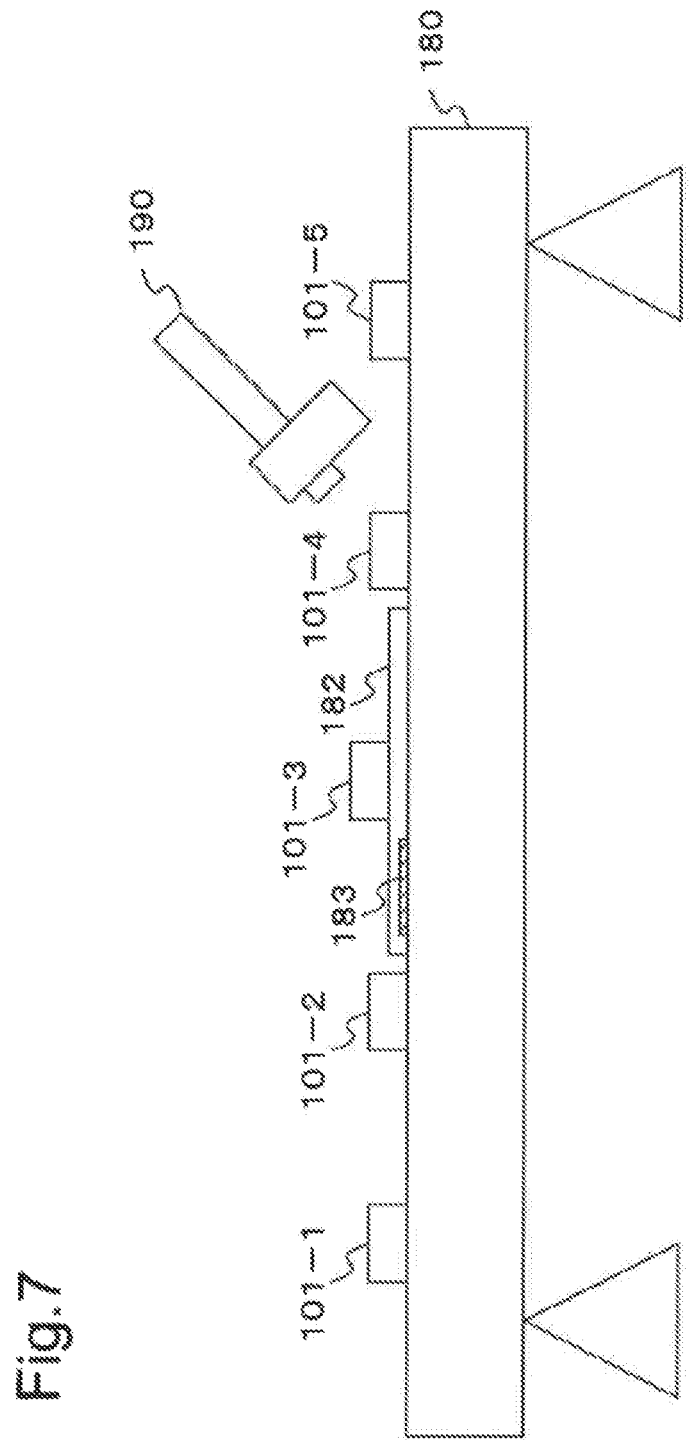
FIG. 7 is a diagram illustrating an example of a test piece according to an example 2 of the present invention.

FIG. 7 illustrates an example of a concrete block as a target of assessment on damage. In the present example, a rectangular-shaped concrete block 180 and a rectangular-shaped metal plate 182 were used as a test piece. To one surface of the concrete block 180, the metal plate 182 was bonded with an adhesive. The metal plate 182 and the concrete block 180 were bonded to each other in such a manner that center points of the bonded surfaces coincided with each other.

On the surface of the concrete block 180 to which the metal plate 182 was bonded, five detection units 101 including detection units 101-1 to 101-5 were attached. As the detection unit 101, a vibration sensor similar to that in the first example was used. Note that the detection unit 101-3 was attached to the metal plate 182. Then, to the bonded part between the concrete block 180 and the metal plate 182, a tensile load is applied in a direction opposite to a mutually bonded direction, whereby a gap 183 was formed. Note that the gap 183 was formed at a portion that was in the bonded part between the metal plate 182 and the concrete block 180 and that was between the detection units 101-2 and 101-3.

In each of cases before and after the gap 183 was formed, the concrete block 180 was excited by hammering that uses a hammer 190. In each of the cases, each of the detection units 101-1 to 101-5 detected a vibration caused by the excitation.

Based on information indicating the vibrations detected by the detection units 101-1 to 101-5, the assessing device 100 assessed damage in the bonded part between the metal plate 182 and the concrete block 180. First, the dominant frequency identifying unit 110 acquired a Fourier spectrum by performing the Fourier transform on the information indicating each of the vibrations before and after the gap 183 was formed. Then, the dominant frequency identifying unit 110 identified, as a dominant frequency, a frequency at which an amplitude becomes maximum in each of the Fourier spectra before and after the gap 183 was formed.

Similarly to the example 1, according to the information indicating the vibrations detected by the detection units 101-1 to 101-5 at a time point before the gap 183 was formed, the dominant frequency was common to the detection units 101-1 to 101-5. A vibration shape at the dominant frequency was a shape similar to that of the flexural primary vibration mode.

According to the information indicating the vibrations detected by the detection units 101-1 to 101-5 at a time point after the gap 183 was formed, the dominant frequency was common to the detection units 101-1 to 101-5. A vibration shape at the dominant frequency was a shape similar to that of the flexural primary vibration mode.

Subsequently, assuming that a phase amount is a value of a phase at the dominant frequency in each of the Fourier spectra before and after the above-described gap 183 was formed, the phase difference identifying unit 120 acquired, as a phase difference, each difference between the phase amounts. In the present example, the phase difference identifying unit 120 identified, as the phase difference, the difference between the phase amounts, at the dominant frequency, of the vibrations detected by the detection units 101-2 and 101-3. The detection units 101-2 and 101-3 are two detection units close to a place where the gap 183 was formed.

Subsequently, similarly to the example 1, the assessing unit 130 acquired a change rate of the phase differences at the dominant frequencies between the vibrations detected by the detection units 101-2 and 101-3 before and after the gap 183 was formed, and thereby assessed damage at the joined part. The change rate of the phase differences at the dominant frequencies between the vibrations detected by the detection units 101-2 and 101-3 were acquired by using the following equation (3). Note that in the equation (3), $\Delta\Phi_2$ represents the change rate of the phase differences at the dominant frequencies between the vibrations detected by the detection units 101-2 and 101-3 before and after the gap 183 was formed. Further, $\Phi_{2before}$ represents the phase difference at the dominant frequency between the vibrations detected by the detection units 101-2 and 101-3 before the gap 183 was formed. In addition, $\Phi_{2after}$ represents the phase difference at the dominant frequency between the vibrations detected by the detection units 101-2 and 101-3 after the gap 183 was formed.

[Equation 3]

$$\Delta\Phi_2 = \frac{\Phi_{2after} - \Phi_{2before}}{\Phi_{2before}} \quad (3)$$

Note that also in the present example, for comparison, a change rate of the dominant frequencies of the vibrations detected by the detection unit 101-2 was acquired by using the equation (4). Note that in the equation (4), $\Delta F_2$ represents the change rate of the dominant frequencies of the vibrations detected by the detection unit 101-2 before and after the gap 183 was formed. Further, $F_{2before}$ represents the dominant frequency of the vibration detected by the detection unit 101-2 before the gap 183 was formed. In addition, $F_{2after}$ represents the dominant frequency of the vibration detected by the detection unit 101-2 after the gap 183 was formed. Note that in the present example, as described above, the dominant frequencies of the vibrations detected by the detection units 101-1 to 101-5 are common at each of the time points before and after the gap 183 was formed.

[Equation 4]

$$\Delta F_2 = \frac{F_{2after} - F_{2before}}{F_{2before}} \quad (4)$$

FIG. 8 illustrates the change rate $\Delta\Phi_2$ of the phase differences and the change rate $\Delta F_2$ of the dominant frequencies described above. The change rate $\Delta\Phi_2$ of the phase differences was −30%. Meanwhile, the change rate $\Delta F_2$ of the dominant frequencies was −5%. In other words, a change rate of $\Delta\Phi_2$ to the change rate $\Delta F_2$ was six times. Similarly to the example 1, also in the present example, the change rate of the phase differences at the dominant frequencies was a relatively large change rate, as compared with the change rate of the dominant frequencies.

In the present example, it is considered that a rigidity of the test piece constituted by the concrete block 180 and the metal plate 182 decreased due to the formation of the gap 183 at the bonded part between the concrete block 180 and the metal plate 182. It is considered that as a result of this, the natural frequency of the test piece decreased. Then, it is considered that the dominant frequency corresponding to the natural frequency decreased following the decrease of the natural frequency of the test piece. Further, it is considered that the formation of the gap 183 at a portion between the detection units 101-2 and 101-3 decreased a mechanical characteristic of the portion that was in the test piece and that was between the detection unit 101-2 and the detection unit 101-3. It is considered that as a result of this, the phase difference at the dominant frequency between the vibrations detected by the detection units 102-2 and 101-3 increased. Then, it is considered that since the gap 183 was local, the above-described change rate of the phase differences at the dominant frequencies became relatively large, as compared with the change rate of the dominant frequencies.

Similarly to the example 1, also in the present example, for the local damage at the joined part in the structure, the phase difference at the dominant frequency between the vibrations detected by the two detection units 101 changes remarkably as compared with the dominant frequency. Therefore, it is confirmed that even when assessment is difficult in a method based on a change rate of a dominant frequency, the assessing device 100 or the like can assess generation of damage at a joined part in a structure, by appropriately setting a threshold value used in the assessing unit 130, or the like.

As described above, it is confirmed that the assessing device 100 in the example embodiment of the present invention can assess presence or absence of the local damage in the structure.

Further, the change rate of the phase differences in the present example is larger than the change rate of the phase differences in the example 1. In other words, the change rate of the phase differences when local damage is generated at a joined part between constituent members of the structure is larger than the change rate of the phase differences when local damage is generated in one constituent member of the structure. In other words, it is confirmed that the assessing device 100 in the example embodiment of the present invention can be used for assessing the local damage generated at the joined part between the constituent members of the structure.

Although the present invention is described above with reference to the example embodiment and the examples, the present invention is not limited to the above-described example embodiment and examples. Various modifications that can be understood by those skilled in the art can be made on a configuration and details of the present invention within the scope of the present invention. Further, configurations in the example embodiments can be combined with each other without departing from the scope of the present invention.

This application claims priority based on Japanese Patent Application No. 2016-208663 filed on Oct. 25, 2016, the disclosure of which is incorporated herein by reference in its entirety.

REFERENCE SIGNS LIST

10 Assessing system
100 Assessing device
101 Detection unit
110 Dominant frequency identifying unit
120 Phase difference identifying unit
130 Assessing unit
180 Concrete block
181 Crack
182 Metal plate
183 Gap
190 Hammer

What is claimed is:

1. An assessing device comprising:
   a dominant frequency identifying unit identifying a dominant frequency of a vibration at each of a plurality of spots in a structure, based on information indicating the vibration at each of the plurality of spots;
   a phase difference identifying unit identifying a phase difference at the dominant frequency between the vibrations at two spots included in the plurality of spots, based on the dominant frequency and the information indicating the vibrations; and
   an assessing unit assessing a damage in the structure, based on a change rate of the phase difference between the two spots and a phase difference at a reference timing for same spots.

2. The assessing device according to claim 1, wherein the dominant frequency identifying unit identifies the dominant frequency, based on a damped free vibration included in the information indicating the vibration.

3. The assessing device according to claim 2, wherein the dominant frequency identifying unit identifies, as the dominant frequency, a frequency at which an amplitude is largest among frequency components included in the damped free vibration.

4. The assessing device according to claim 1, wherein the assessing unit assesses the damage at a spot between the two spots.

5. The assessing device according to claim 1, wherein the assessing unit assesses the damage, based on a variation of the phase difference identified for a same place.

6. An assessing system comprising:
a plurality of detection units detecting vibrations; and
the assessing device according to claim 1 that assesses the damage in the structure, based on the information indicating the vibrations detected by the detection units.

7. An assessing method comprising:
identifying a dominant frequency of a vibration at each of a plurality of spots in a structure, based on information indicating the vibration at each of the plurality of spots;
identifying a phase difference at the dominant frequency between the vibrations at two spots included in the plurality of spots, based on the dominant frequency and the information indicating the vibrations; and
assessing a damage in the structure, based on a change rate of the phase difference between the two spots and a phase difference at a reference timing for same spots.

8. A computer-readable recording medium that non-temporarily stores a program causing a computer to perform:
processing of identifying a dominant frequency of a vibration at each of a plurality of spots in a structure, based on information indicating the vibration at each of the plurality of spots;
processing of identifying a phase difference at the dominant frequency between the vibrations at two spots included in the plurality of spots, based on the dominant frequency and the information indicating the vibrations; and
processing of assessing a damage in the structure, based on a change rate of the phase difference between the two spots and a phase difference at a reference timing for same spots.

9. The assessing device according to claim 1, wherein, by using an autoregressive model, the dominant frequency identifying unit models a damped free vibration represented by the information indicating the vibration, and identifies the dominant frequency, based on a frequency characteristic of the model.

10. The assessing method according to claim 7, further comprising:
by using an autoregressive model, modelling a damped free vibration represented by the information indicating the vibration,
wherein the dominant frequency is identified, based on a frequency characteristic of the model.

11. The computer-readable recording medium according to claim 8, wherein the program further causes the computer to perform:
processing of, by using an autoregressive model, modelling a damped free vibration represented by the information indicating the vibration,
wherein the dominant frequency is identified, based on a frequency characteristic of the model.

\* \* \* \* \*